July 8, 1941. A. J. SORENSEN 2,248,394
AXLE CONTACT
Filed July 12, 1939 2 Sheets-Sheet 1
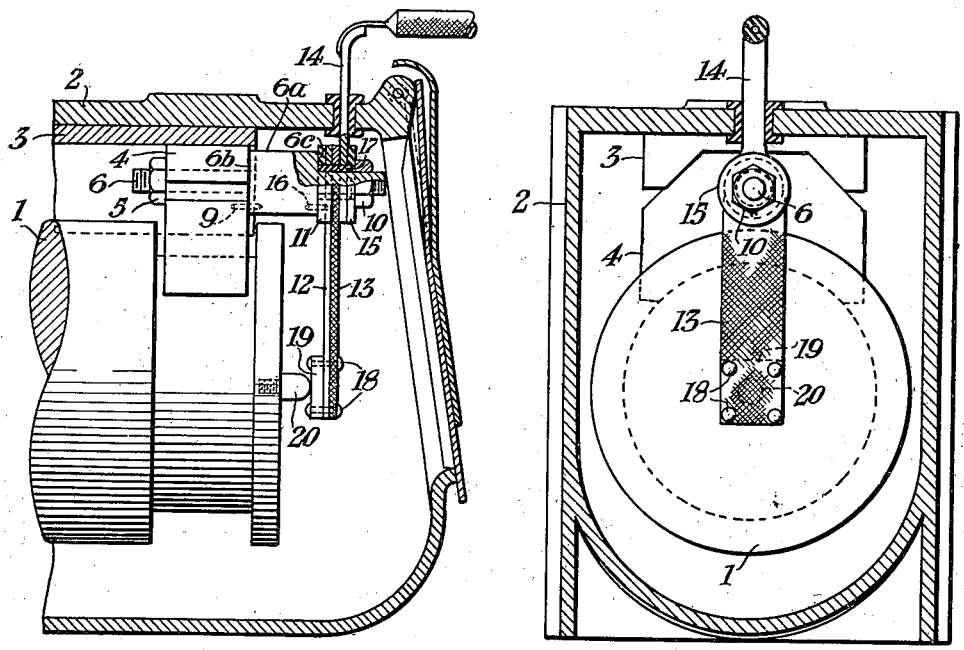
Fig.1. Fig.3.
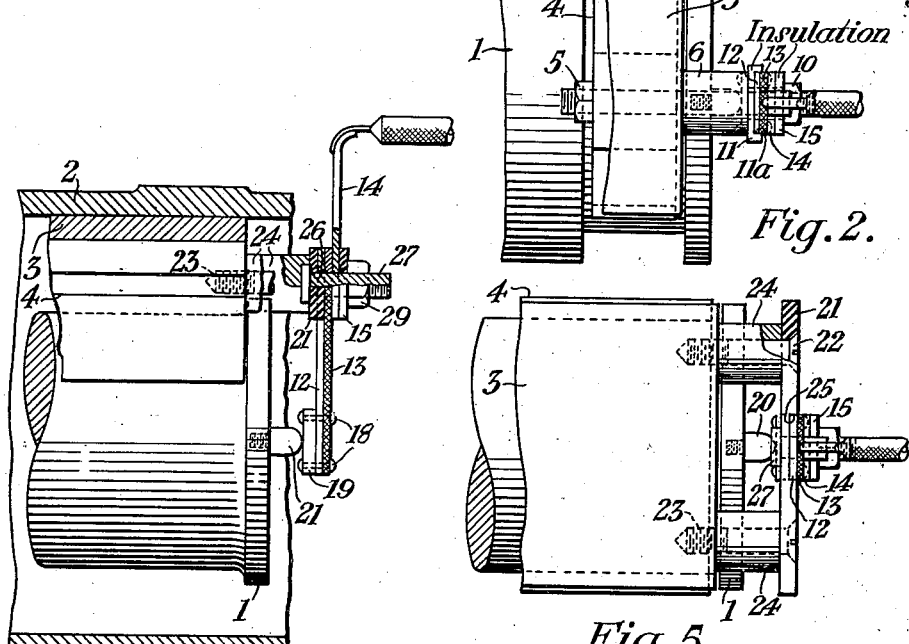
Fig.2.
Fig.4. Fig.5.
INVENTOR
Andrew J. Sorensen.
BY
HIS ATTORNEY July 8, 1941.  A. J. SORENSEN  2,248,394

AXLE CONTACT

Filed July 12, 1939  2 Sheets-Sheet 2

INVENTOR
Andrew J. Sorensen.
BY
HIS ATTORNEY

Patented July 8, 1941

2,248,394

UNITED STATES PATENT OFFICE 2,248,394

AXLE CONTACT

Andrew J. Sorensen, Edgewood, Pa., assignor to The Union Switch & Signal Company, Swissvale, Pa., a corporation of Pennsylvania Application July 12, 1939, Serial No. 284,134

4 Claims. (Cl. 173—324)

My invention relates to axle contacts.

In connection with certain forms of railway signaling systems, such for example, as the railway train communication system disclosed in Letters Patent of the United States No. 2,064,642, granted to Paul N. Bossart, on December 15, 1936, it is desirable to provide a good contact with two spaced axles of a vehicle in order to facilitate the transmission of current from apparatus located on the vehicle to the trackway. Heretofore, it has been customary to obtain this contact by connecting the two circuit terminals to the journal brasses on the respective axles, in which event current flows between the two terminals not only through the wheels and rails, but also through the car body, brake rigging, etc. It has been found that the film of oil which normally exists between the journal brasses and the axles offers considerable resistance to the flow of current, causing a greater proportion of the current to flow through the car body and brake rigging, and less through the rails, than would be the case if this film were not present. For the satisfactory functioning of systems of the type referred to it is desirable to have as much current as is possible flow through the rails, and one object of my present invention is to provide a contact which will penetrate the oil film adhering to the axle, and thereby increase the amount of current flowing in the rail.

Another object of my invention is to provide a contact which can be mounted in the limited space available within the journal box of a railway vehicle, and which at the same time is inexpensive to manufacture.

A further object of my invention is to provide a contact of the type described which can be used on those axles which have the end of the axle covered with a heavy leaf spring to take up end play.

Other objects and characteristic features of my invention will become apparent as the description proceeds.

Figure 7:
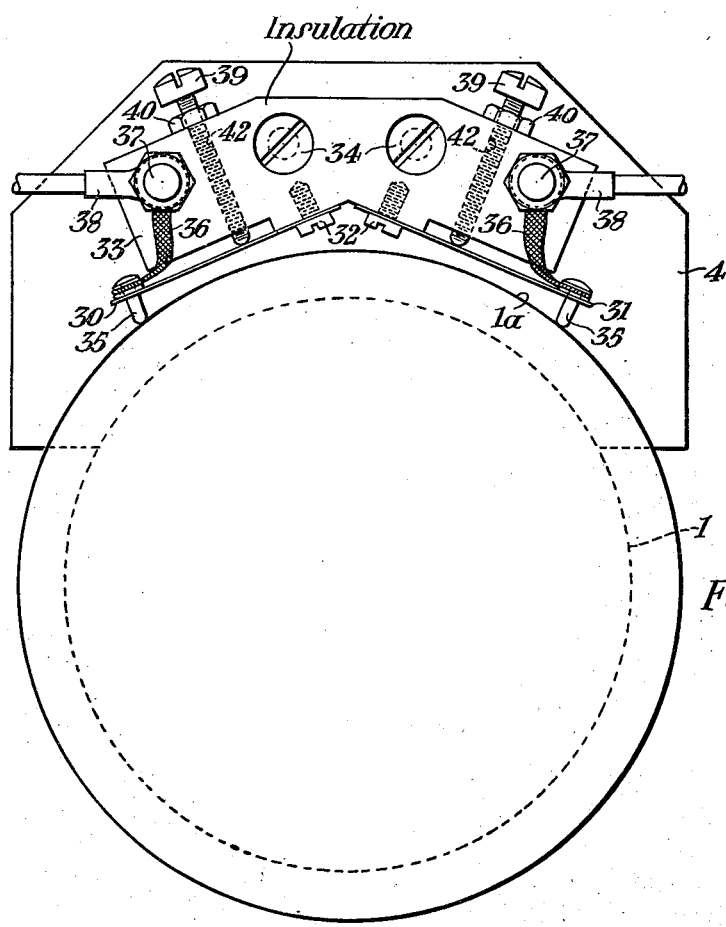
Figure 6:
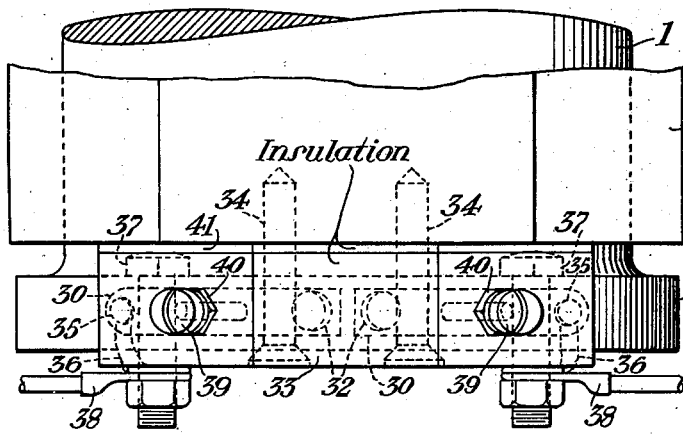

In the accompanying drawings, Fig. 1 is a vertical sectional view showing an axle provided with one form of axle contact embodying my invention. Figs. 2 and 3 are top plan and end views, respectively, of the axle and associated contact shown in Fig. 1. Figs. 4 and 5 are views similar to Figs. 1 and 2, respectively, showing a modified form of the axle contact illustrated in Figs. 1 and 2. Figs. 6 and 7 are fragmentary top plan and end views, respectively, showing another form of axle contact which also embodies my invention.

Similar reference characters refer to similar parts in each of the several views.

Referring first to Figs. 1, 2 and 3, the reference character 1 designates a vehicle axle, and the reference character 2 designates a journal box which is supported by the axle 1 in the conventional manner through the medium of the usual iron wedge 3 and journal brass 4. Secured to the journal brass 4 by means of a nut 5 is a metal stud 6 having an enlarged central unthreaded portion 6a which forms two shoulders 6b and 6c, respectively. The shoulder 6b abuts against the outer end of the journal brass, and has mounted therein a dowel pin 9 which extends into the brass for the purpose of preventing the stud from turning. The outer end of the stud projects outwardly beyond the outer end of the axle, and has mounted thereon, between the shoulder 6c and a nut 10, an insulating washer 11, a flexible contact finger 12, a flexible low resistance conducting member 13, a metal terminal or connecting member 14 and an insulating washer 15. The insulating washer 11 is provided in the side next to the finger 12 with a vertical recess 11a which receives the finger in the manner shown in Fig. 2, and this washer is held in the position in which, when the finger is within the recess, its lower end will be opposite the center of the axle, by means of a dowel pin 16 which is mounted in the shoulder 6c, and which projects partway into the washer. The finger 12, conducting member 13 and terminal member 14 are all insulated from the stud by an insulating tube 17 which surrounds the stud between the shoulder 6c and nut 10. The conducting member 13 may, for example, comprise a piece of copper braid, the lower end of which is riveted to the finger by means of rivets 18, which rivets also serve to secure a wear plate 19 to the finger. The wear plate 19 cooperates with the semispherical end of a metal pin 20 which is mounted in the center of the axle. The outer end of the pin 20 is preferably chromium plated to prevent wear. The desired contact pressure is obtained between the wear plate and the pin by bending the contact finger, and the parts are so adjusted that this pressure will be sufficiently high to break through the oil film which is present when the axle is rotating, thereby insuring a good low resistance contact directly with the axle. The external circuit wires which it is desired to connect to the axle may be soldered or otherwise fastened to the terminal member 14.

One advantage of an axle contact constructed in the manner just described is that since the contact pin is disposed at the center of the axle, the rate of travel of the two contact surfaces over each other is low, which greatly reduces the wear.

Another advantage of an axle contact constructed in the manner just described is that it requires a relatively small amount of space, and utilizes a minimum number of parts.

Referring now to Figs. 4 and 5, the axle contact here shown is identical with that shown in Figs. 1, 2 and 3, except for the means for insulatingly securing the contact finger 12, and members 13 and 14 to the journal brass. As here illustrated, these means comprise an insulating block 21 which is attached by means of two screws 22 and 23 and two sleeves 24 to the outer end of the journal brass, the sleeves 24 being mounted on the screws and serving to space the block the proper distance from the journal brass. The block is provided intermediate its ends with a vertical recess 25, and with a through hole 26 which receives a bolt 27. The finger 12 and members 13 and 14 are disposed on the bolt with the finger resting in the recess 25, and are secured in place by means of a nut 29. The heads of the screws 22 and 23 are preferably countersunk into the surface of the insulating block to prevent accidental contact between the conductor terminals and the journal brass through the screw heads.

Referring now to Figs. 6 and 7, in the form of contact here shown two flexible contact fingers 30 and 31 are each secured at one end by means of screws 32 to an insulating block 33, which block in turn is fastened to the end of the journal brass 4 by means of two machine screws 34, the heads of which are countersunk within the block. The fingers 30 and 31 extend in opposite directions from the underside of the block directly above the usual shoulder 1a which is formed on the outer end of the axle, and are each provided at their free ends with a contact member or pin 35 having a semispherical tip which rides on the periphery of the shoulder 1a. To prevent wear, the tips of the pins 35 are preferably chromium plated. Current connections to the fingers are made through the medium of flexible pigtails 36 which latter are secured at one end directly to the pins 35, and at their other end to bolts 37 carrying terminal lugs 38 to which the current wires are shown attached. The bolts 37 are mounted in the insulating block 33 in a manner which will be readily apparent from an inspection of the drawings. It is necessary for the proper functioning of the contact that the pins 35 should exert sufficient pressure on the shoulder 1a to break through the oil film, and in order to obtain the desired pressure two adjusting screws 39 are provided, one for each spring. These screws extend downwardly through threaded holes 42 in such positions that by screwing the screws downwardly the pressure exerted by the screws on the fingers will be increased, and each screw has mounted thereon a suitable lock nut 40 for locking the screw in its adjusted position. It should be noted that the bolts 37 have non-circular heads countersunk into the block so that they will not turn, and are insulated from the possibility of touching the journal brasses by an insulating spacer 41 which is interposed between the block and the journal brass. The screws 39 will usually be so adjusted that the pressure exerted by the pins 35 will be about six pounds, and if it be assumed that each pin bears on the axle at a spot of about ten thousandths of an inch in area, then the unit pressure will be about twenty thousand pounds per square inch. This pressure is of the order of fifty times as great as that which exists between the journal and the journal brass, and is much more effective in making a connection through the oil film than could possibly be obtained by connecting the terminal wire to the journal brass. The wear on the axle shoulder 1a does not appear to be objectionable with such an adjustment.

Although I have herein shown and described only a few forms of axle contacts embodying my invention, it is understood that various changes and modifications may be made therein within the scope of the appended claims without departing from the spirit and scope of my invention.

Having thus described my invention, what I claim is:

1. A contact adapted to be mounted within a journal box of a vehicle for providing good electrical connection between the axle and a conductor, said contact comprising a stud secured to the journal brass, a flexible contact finger mounted on said stud but insulated therefrom and held in a position on said stud in which its free end is opposite the center of the axle, a wear plate secured to the free end of said finger, a contact pin mounted in the center of one end of the axle in direct electrical contact with the axle and provided with a semispherical end which is engaged by said wear plate, and a terminal member mounted on said stud but insulated therefrom, said member being connected with said finger and having said conductor secured thereto.

2. A contact adapted to be mounted within a journal box of a vehicle for providing good electrical connection between the axle and a conductor, said contact comprising a stud secured to the journal brass, a flexible contact finger mounted on said stud but insulated therefrom and held in a position on said stud in which its free end is opposite the center of the axle, a wear plate secured to the free end of said finger, a contact pin mounted in the center of the axle and provided with a semispherical end which is engaged by said wear plate, and a terminal member mounted on said stud but insulated therefrom, said member being connected with said finger and having said conductor secured thereto, and said finger being adjusted to exert a relatively high contact pressure between said pin and said wear plate to penetrate any oil film which may be present due to the journal lubricant.

3. A contact adapted to be mounted within a journal box of a vehicle for providing good electrical connection between the axle and a conductor, said contact comprising an insulating block secured to the outer end of the journal brass and provided with a slot and with a bolt passing through said slot, a flexible contact finger secured to said block by said bolt within said slot and held by said slot in a position in which its free end is opposite the center of the axle, a wear plate secured to the free end of said finger, a contact pin mounted in the center of the one end of the axle in direct electrical contact with the axle and provided with a semispherical end which is engaged by said wear plate, and a terminal member mounted on said stud but insulated therefrom, said member being connected with said finger and having said conductor secured thereto.

4. A contact adapted to be mounted within a journal box of a vehicle for providing good electrical connection between the axle and a conductor, said contact comprising an insulating block secured to the outer end of the journal brass and provided with a slot and with a bolt passing through said slot, a flexible contact finger secured to said block by said bolt within said slot and held by said slot in a position in which its free end is opposite the center of the axle, a wear plate secured to the free end of said finger, a contact pin mounted in the center of the axle and provided with a semispherical end which is engaged by said wear plate, and a terminal member mounted on said stud but insulated therefrom, said member being connected with said finger and having said conductor secured thereto, and said finger being adjusted to exert a relatively high contact pressure between said pin and said wear plate to penetrate any oil film which may be present due to the journal lubricant.

ANDREW J. SORENSEN.